(12) United States Patent  
Keithley

(10) Patent No.: US 9,704,228 B1  
(45) Date of Patent: Jul. 11, 2017

(54) SYSTEM AND METHOD FOR FRACTIONAL PIXEL DILATION AND EROSION

(71) Applicant: MARVELL INTERNATIONAL LTD., Hamilton (BM)

(72) Inventor: Douglas Keithley, Boise, ID (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

(21) Appl. No.: 14/836,263

(22) Filed: Aug. 26, 2015

Related U.S. Application Data

(60) Provisional application No. 62/041,918, filed on Aug. 26, 2014.

(51) Int. Cl.
*G06K 9/00* (2006.01)
*G06T 5/30* (2006.01)
*G06T 3/40* (2006.01)

(52) U.S. Cl.
CPC .............. *G06T 5/30* (2013.01); *G06T 3/4007* (2013.01); *G06T 2207/10024* (2013.01); *G06T 2207/20036* (2013.01)

(58) Field of Classification Search
CPC ...................... G06T 7/402; G06T 2207/20036
See application file for complete search history.

(56) References Cited

U.S. PATENT DOCUMENTS

| | | | | |
|---|---|---|---|---|
| 5,258,854 A | * | 11/1993 | Eschbach | G06K 15/128 358/3.07 |
| 6,195,659 B1 | * | 2/2001 | Hyatt | G06K 9/6218 |
| 6,215,915 B1 | * | 4/2001 | Reyzin | G06T 3/00 345/648 |
| 2003/0218780 A1 | * | 11/2003 | Braun | H04N 1/4055 358/3.12 |

* cited by examiner

*Primary Examiner* — Eueng-Nan Yeh

(57) ABSTRACT

Apparatus, methods, and other embodiments associated with image morphology operations that provide fractional pixel dilation and erosion are described. According to one embodiment, an apparatus includes scaling logic configured to scale up an input data structure of image pixel data from a first number of pixels to a second number of pixels to generate a scaled-up data structure of image pixel data. The apparatus also includes morphology logic configured to perform a morphological operation on the scaled-up data structure of image pixel data to generate a morphed data structure of image pixel data. The apparatus further includes sub-sampling logic configured to sub-sample the morphed data structure of image pixel data to generate an output data structure of image pixel data. The output data structure of image pixel data has a same number of pixels as the input data structure of image pixel data.

21 Claims, 10 Drawing Sheets

| Linear interp | max | Dilation_1 | min | Erosion_1 |
|---|---|---|---|---|
| 30 | | | | |
| 30 | 30 | | 30 | |
| 30 | 30 | 30 | 30 | 30 |
| 30 | 30 | | 30 | |
| 30 | 30 | | 30 | |
| 30 | 80 | 80 | 30 | 30 |
| 80 | 130 | | 30 | |
| 130 | 180 | | 80 | |
| 180 | 180 | 180 | 130 | 130 |
| 140 | 180 | | 100 | |
| 100 | 140 | | 60 | |
| 60 | 100 | 100 | 60 | 60 |
| 60 | 60 | | 60 | |
| 60 | 60 | | 60 | |
| 60 | 60 | 60 | 60 | 60 |
| 60 | 60 | | 60 | |
| 60 | | | | |

FIG. 3

A 0.333 pixel dilation/erosion

| f(x) | Dil_A | Dil_B | delta | Dil_3 | Ero_A | Ero_B | delta | Ero_3 |
|---|---|---|---|---|---|---|---|---|
| 30 | | | | | | | | |
| 30 | 30 | 30 | 0 | 30 | 30 | 30 | 0 | 30 |
| 30 | 30 | 180 | 150 | 80 | 30 | 30 | 0 | 30 |
| 180 | 180 | 180 | 0 | 180 | 180 | 30 | -150 | 130 |
| 60 | 60 | 180 | 120 | 100 | 60 | 60 | 0 | 60 |
| 60 | 60 | 60 | 0 | 60 | 60 | 60 | 0 | 60 |
| 60 | | | | | | | | |

And a 1.333 pixel dilation/erosion

| f(x) | Dil_A | Dil_B | delta | Dil_3 | Ero_A | Ero_B | delta | Ero_3 |
|---|---|---|---|---|---|---|---|---|
| 30 | | | | | | | | |
| 30 | | | | | | | | |
| 30 | 30 | 180 | 150 | 80 | 30 | 30 | 0 | 30 |
| 30 | 180 | 180 | 0 | 180 | 30 | 30 | 0 | 30 |
| 180 | 180 | 180 | 0 | 180 | 30 | 30 | 0 | 30 |
| 60 | 180 | 180 | 0 | 180 | 60 | 30 | -30 | 50 |
| 60 | 60 | 180 | 120 | 100 | 60 | 60 | 0 | 60 |
| 60 | | | | | | | | |
| 60 | | | | | | | | |

FIG. 6

| f(x) | | max(b2*delta) | Dilation_2 | min(b2*delta) | Erosion_2 |
|---|---|---|---|---|---|
| 30 | | 0 | 0 | 0 | |
| 30 | 0 | 0 | 0 | 30 | 0 | 30 |
| 30 | 0 | 150 | 50 | 80 | 0 | 30 |
| 180 | -150 | -120 | 0 | 180 | -50 | 130 |
| 60 | 120 | 0 | 40 | 100 | 0 | 60 |
| 60 | 0 | 0 | 0 | 60 | 0 | 60 |
| 60 | 0 | | 0 | | 0 | |

FIG. 9

SYSTEM AND METHOD FOR FRACTIONAL PIXEL DILATION AND EROSION

CROSS REFERENCE TO RELATED APPLICATIONS

This patent disclosure claims the benefit of U.S. Provisional Application Ser. No. 62/041,918 filed on Aug. 26, 2014, which is incorporated herein by reference.

BACKGROUND

In image processing, basic morphological operations include dilation and erosion operations. Dilation operations today are limited to adding whole pixels to extend the boundaries of shapes and objects within an image. Conversely, erosion operations today are limited to removing whole pixels to reduce the boundaries of shapes and objects within an image. The number of whole pixels added or removed by a morphological operation depends on the size and shape of a structuring element or window used to process the image. For any given pixel in an image, dilation and erosion operations consider the values of neighboring pixels to determine if the value of the given pixel is to be changed. Dilation and erosion operations can provide desired enhancements to an image such as, for example, removing noise from the image, isolating individual objects in an image, joining disparate objects in an image, and finding intensity bumps or holes in an image.

SUMMARY

In general, in one aspect this specification discloses an image processing apparatus that includes scaling logic, morphology logic, and sub-sampling logic for performing fractional pixel image dilation and erosion. Scaling logic is configured to scale up an input data structure of image pixel data from a first number of pixels to a second number of pixels to generate a scaled-up data structure of image pixel data. Morphology logic is configured to perform a morphological operation on the scaled-up data structure of image pixel data to generate a morphed data structure of image pixel data. Sub-sampling logic is configured to sub-sample the morphed data structure of image pixel data to generate an output data structure of image pixel data having a same number of pixels as the input data structure of image pixel data. The output data structure of image pixel data represents a dilated image or an eroded image.

In general, in another aspect, this specification discloses a method that is performable, for example, by an image processing apparatus to provide fractional pixel image dilation and erosion. The method includes performing a first integer morphological operation on an input data structure of image pixel data based on a first integer morphological distance value to generate a first data structure of image pixel data. The method also includes performing a second integer morphological operation on the input data structure of image pixel data based on a second integer morphological distance value to generate a second data structure of image pixel data. The second integer morphological distance value is one integer value greater than the first integer morphological distance value. The method further includes subtracting the first data structure of image pixel data from the second data structure of image pixel data to generate a delta data structure of image pixel data. The method also includes weighting each pixel of the delta data structure of image pixel data by a fractional pixel value to generate a fractional data structure of image pixel data. The method further includes adding the fractional data structure of image pixel data to the first data structure of image pixel data to generate an output data structure of image pixel data. The output data structure of image pixel data represents a dilated image or an eroded image.

In general, in another aspect, this specification discloses an integrated circuit device for performing fractional pixel image dilation and erosion. In one embodiment, the integrated circuit device includes subtraction logic, weighting logic, selection logic, and summing logic. Subtraction logic is configured to, for each pixel in a first data structure of image pixel data, perform a subtraction operation between a pixel and each of nine adjacent pixels, including the pixel itself, to generate nine delta values. Weighting logic is configured to, for each pixel in the first data structure of image pixel data, weight each of the nine delta values by a fractional pixel value to generate nine weighted values. Selection logic is configured to select a maximum value of the nine weighted values for each pixel in the first data structure of image pixel data to generate a maximum data structure of image pixel data. Alternately, selection logic is configured to select a minimum value of the nine weighted values for each pixel in the first data structure of image pixel data to generate a minimum data structure of image pixel data. Summing logic is configured to add the first data structure of image pixel data to the maximum data structure of image pixel data to generate a dilated data structure of image pixel data. Alternately, summing logic is configured to add the first data structure of image pixel data to the minimum data structure of image pixel data to generate an eroded data structure of image pixel data.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

FIG. 3 illustrates one example of processing image pixel data using the method of FIG. 2 as performed by the image processing device of FIG. 1.

FIG. 6 illustrates two examples of processing image pixel data using the method of FIG. 5 as performed by the image processing device of FIG. 4.

FIG. 9 illustrates one example of processing image pixel data using the method of FIG. 8 as performed by the image processing device of FIG. 7.

DETAILED DESCRIPTION

Figure 1:
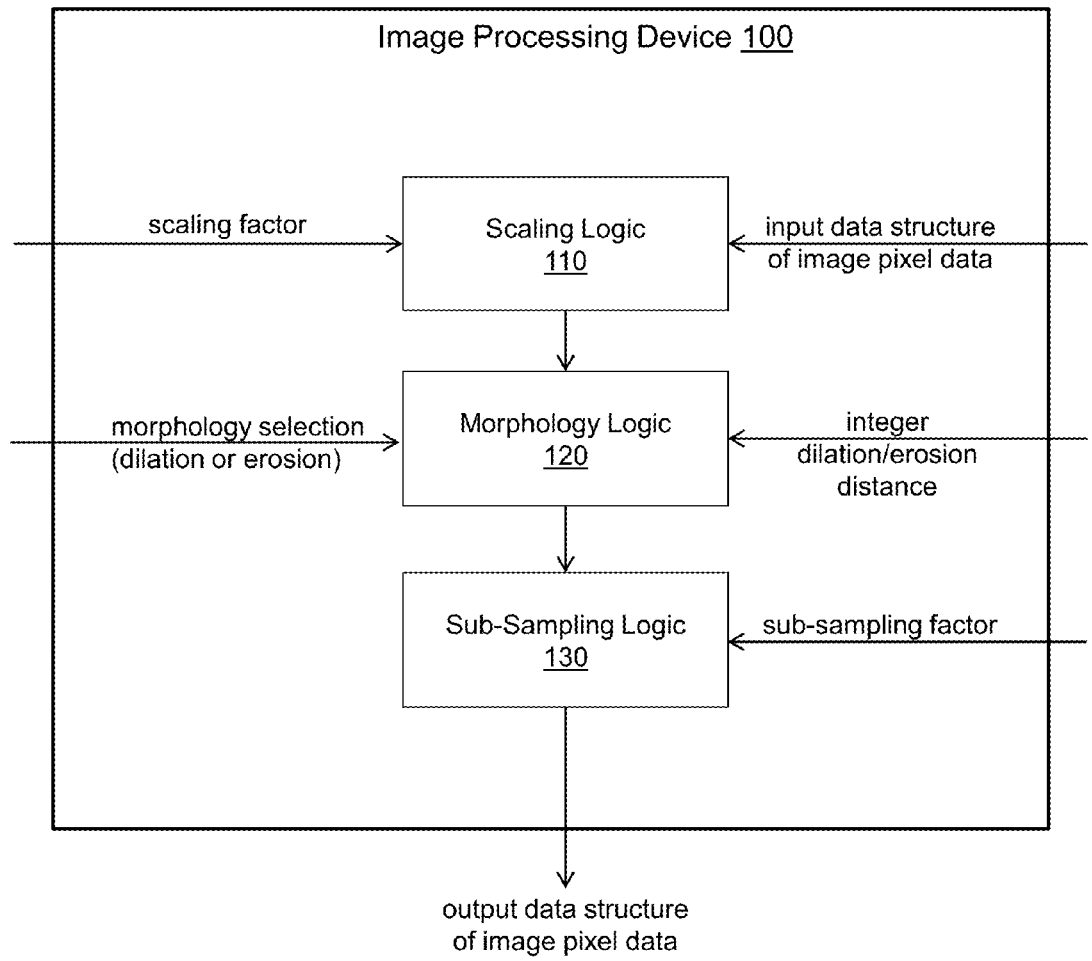
FIG. 1 illustrates one embodiment of an image processing device configured to dilate or erode data structures of image pixel data.

Described herein are examples of systems, apparatus, methods, and other embodiments associated with morphological image processing. In particular, embodiments are described herein that are associated with fractional pixel image dilation and erosion. Such embodiments provide for dilation distances and erosion distances that include a fraction of a pixel. Morphological image processing operations are based on shapes within images and apply a defined window structure to an input array (input data structure) of image pixel data to generate an output array (output data structure) of image pixel data that is of the same size as the input array. The image represented by the output array of image pixel data may be dilated or eroded, in accordance with various embodiments.

Dilation is the morphological process of extending shapes within an image along the edges of the shapes. Erosion is the morphological process of contracting shapes within an image along the edges of the shapes. Dilation and erosion distances of one or more integer number of pixels may be achieved in accordance with certain morphological processes. However, embodiments disclosed herein provide for dilation and erosion distances that include fractions of pixels. That is, dilation and erosion distances can fall between two pixels. Such fractional pixel dilation and erosion may be desirable when integer pixel dilation and erosion is too coarse or too aggressive for certain imaging applications. Dilation and erosion of an image on a fractional pixel basis can be represented, in accordance with one embodiment, as reduced or increased pixel values or amplitudes of whole pixels along the edges of shapes within the image.

The term "morphological operation", as used herein, refers to a process that alters the appearance of shapes within images. One morphological operation is that of dilation which extends shapes within an image along edges of the shapes. Another morphological operation is that of erosion which contracts shapes within an image along edges of the shapes.

The term "image pixel data", as used herein, refers to the values or amplitudes of picture elements (pixels) of an image as structured within a data structure.

The terms "integer morphological distance" or "integer morphological distance value", as used herein, refer to the distance (in integer number of pixels) from a center pixel (i.e., a pixel under consideration to be replaced) over which a morphological operation is performed. An integer morphological distance may be an integer dilation distance or an integer erosion distance, for example, depending on the nature of the morphological operation (e.g., dilation or erosion). For a two-dimensional rectangular image, an integer morphological distance may extend away from a center pixel in multiple directions, for example, as defined by an (x, y) coordinate system with the center pixel at (0, 0). For example, for an integer morphological distance of one pixel, the morphological operation may be performed over a 3×3 array of pixels with the pixel under consideration (i.e., the pixel to be replaced) at the center of the 3×3 array of pixels. For an integer morphological distance of two pixels, the morphological operation may be performed over a 5×5 array of pixels with the pixel under consideration (i.e., the pixel to be replaced) at the center of the 5×5 array of pixels.

The terms "fractional morphological distance" or "fractional morphological distance value", as used herein, refer to the distance (in fractional number of pixels) from a center pixel (or pixel under consideration to be replaced) over which a morphological operation is effectively performed. A fractional morphological distance may be a fractional dilation distance or a fractional erosion distance, for example.

The terms "morphological distance" or "morphological distance value", as used herein, may refer generally to either an integer morphological distance or a fractional morphological distance.

Figure 2:
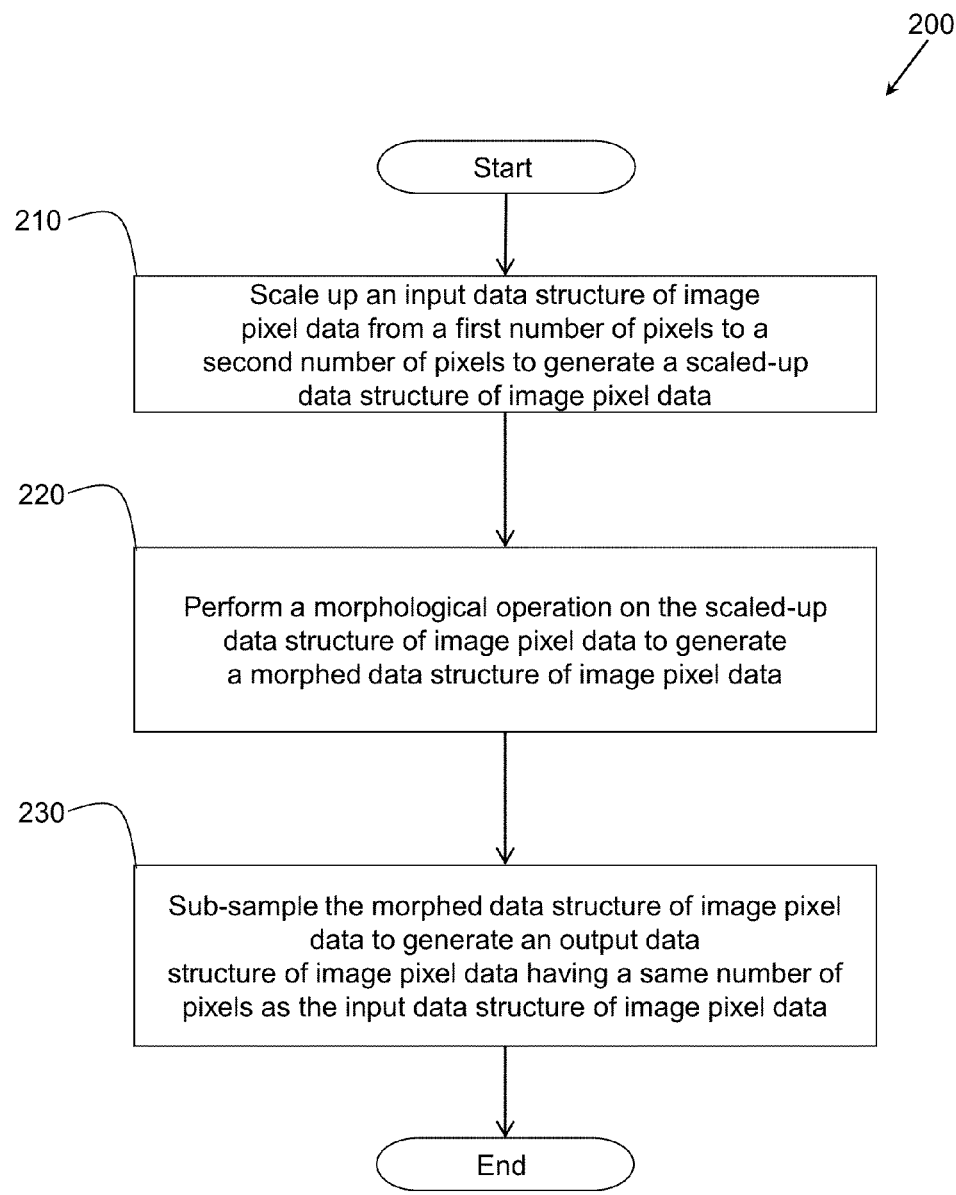
FIG. 2 illustrates one embodiment of a method, performable by the image processing device of FIG. 1, for dilating or eroding data structures of image pixel data.
Figure 7:
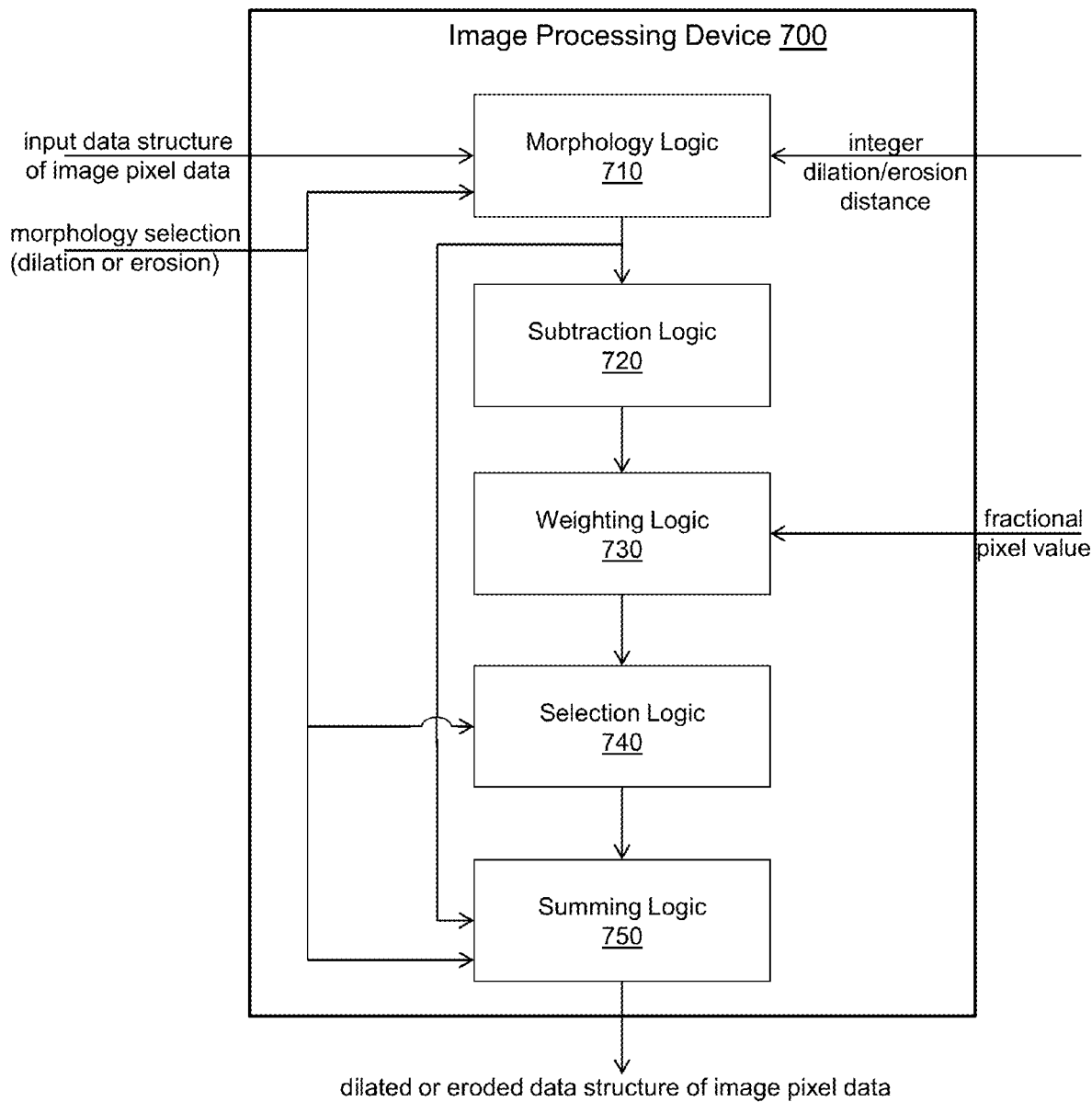
FIG. 7 illustrates one embodiment of an image processing device configured to dilate or erode data structures of image pixel data.
Figure 8:
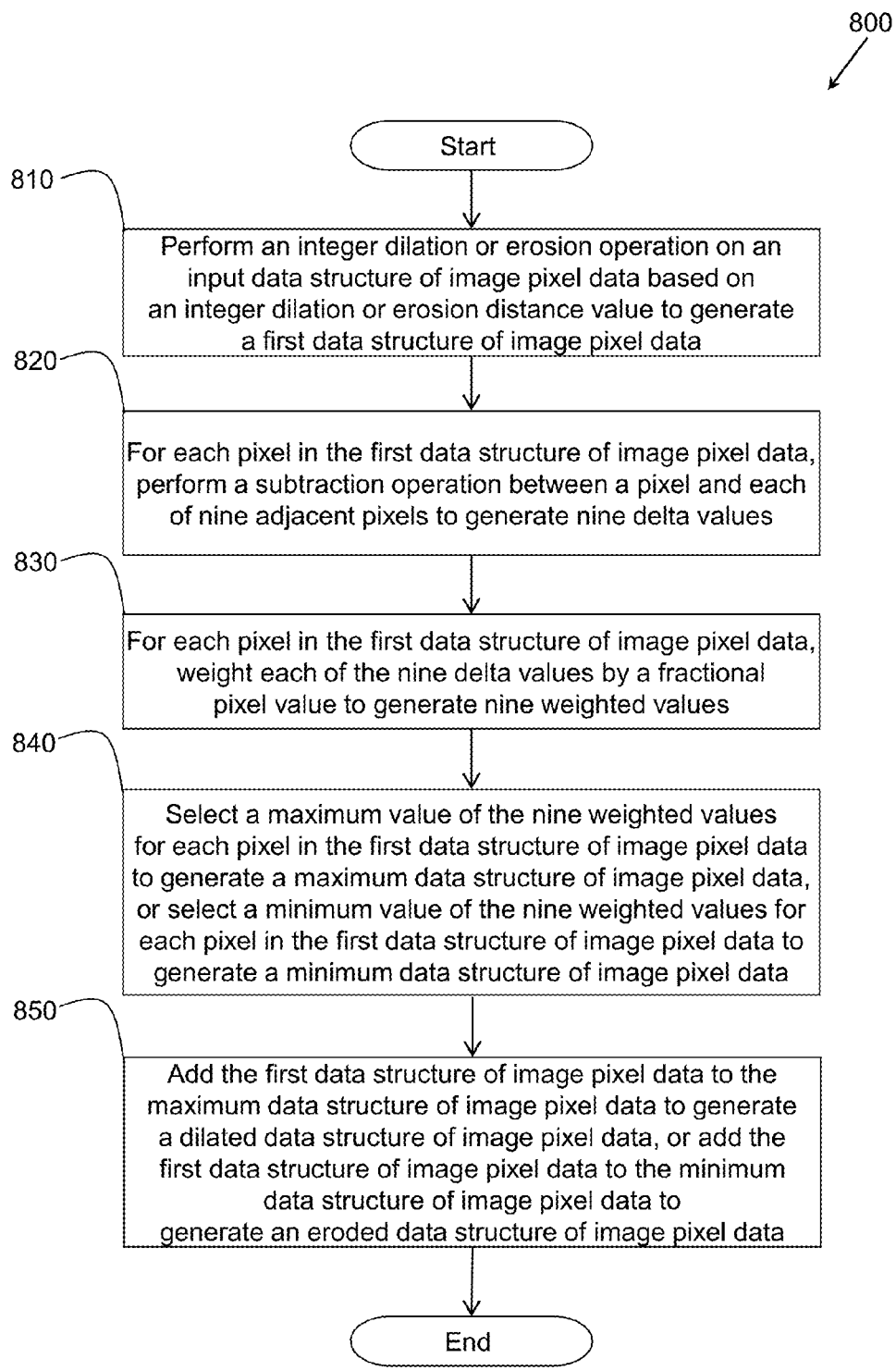
FIG. 8 illustrates one embodiment of a method, performable by the image processing device of FIG. 7, for dilating or eroding data structures of image pixel data.

Embodiments are described herein with respect to FIGS. 1-10. In particular, FIGS. 1-3 are related to a first fractional pixel morphology approach, FIGS. 4-6 and FIG. 10 are related to a second fractional pixel morphology approach, and FIGS. 7-9 are related to a third fractional pixel morphology approach. Each of the three fractional pixel morphology approaches are described, herein, in turn with respect to an apparatus, a method, and a numerical example.

FIG. 1 illustrates one embodiment of an image processing device 100 configured to dilate or erode data structures of image pixel data. For dilation/erosion distances of less than one pixel, an input data structure of image pixel data (representing an image) may be scaled up, dilated or eroded, and then sub-sampled to generate an output data structure of image pixel data of the same size and shape as the input data structure of image pixel data.

The image processing device 100 includes scaling logic 110, morphology logic 120, and sub-sampling logic 130. In one embodiment, the image processing device 100 is implemented on a chip (i.e., a system-on-chip or SOC configuration) including one or more integrated circuits configured to perform one or more of the functions described herein. In another embodiment, the logics of the image processing device 100 may be part of an executable algorithm configured to perform the functions of the logics where the algorithm is stored in a non-transitory medium.

Referring to FIG. 1, scaling logic 110 is configured to scale up an input data structure of image pixel data, in both directions, from a first number of pixels to a second number of pixels, based on a scaling factor, to generate a scaled-up data structure of image pixel data. The input data structure of image pixel data may include, for example, gray-scale image data (representing shades of gray) or binary image data (e.g., representing the two colors of black and white). An input data structure of image pixel data may be structured as an image array with each picture element (pixel) in the image array being assigned a data value.

As an example, if the scaling factor is, for example, three (3), the resultant scaled-up data structure of image pixel data will be an image array that is substantially larger than the input data structure of image pixel data. The picture elements in the scaled up image array are assigned data values based on a scaling algorithm that is applied to the input data structure of image pixel data by scaling logic 110. The scaling algorithm may be, for example, a linear interpolation algorithm, a bi-linear scaling algorithm, or a bi-cubic scaling algorithm. Other scaling algorithms are possible as well, in accordance with other embodiments.

Morphology logic 120 is configured to perform a morphological operation on the scaled-up data structure of image pixel data to generate a morphed data structure of image pixel data. In one embodiment, the morphological operation may include a dilation operation that implements a sliding window operation across the scaled-up data structure of image pixel data. The sliding window operation selects a maximum pixel value from image pixel data within a defined window structure. In another embodiment the morphological operation may include an erosion operation that implements a sliding window operation across the scaled-up data structure of image pixel data. The sliding window operation selects a minimum pixel value from image pixel data within a defined window structure.

As shown in FIG. 1, a morphology selection signal may be input to the image processing device 100 to select dilation or erosion, in accordance with one embodiment. Furthermore, an integer morphology distance value (e.g., a distance value of one (1) pixel) may also be input to the image processing device 100 to establish the dilation or erosion distance to be used by morphology logic 120. The morphology distance value helps to define the window structure of the sliding window operation. For example, a morphology distance value of one (1) pixel may result in a 3×3 defined window structure for a two-dimensional image. The 3×3 defined window structure represents a distance of one (1) pixel in each direction from a center pixel.

In some embodiments, defined window structures may be square. In other embodiments, defined window structures may be rectangular. In still other embodiments, defined window structures may be of other shapes which may correspond to other regular shapes (e.g., triangular, trapezoidal) or irregular shapes, for example.

Sub-sampling logic 130 is configured to sub-sample the morphed data structure of image pixel data to generate an output data structure of image pixel data. The output data structure of image pixel data has a same number of pixels (and image array dimensions) as the input data structure of image pixel data, in accordance with one embodiment. For example, continuing with the example given above, the enlarged image array corresponding to the morphed data structure of image pixel data may be sub-sampled by selecting every $n^{th}$ pixel to generate an image array corresponding to the output data structure of image pixel data. The selection of every $n^{th}$ pixel may be defined by inputting an integer sub-sampling factor n to the image processing device 100.

The integer sub-sampling factor n, which defines the selection of every $n^{th}$ pixel, is chosen such that the size of the image array corresponding to the output data structure of image pixel data is the same as the size of the image array corresponding to the input data structure of image pixel data. As a result, the sub-sampling factor is often the same integer value as the scaling factor.

The image array corresponding to the output data structure of image pixel data represents, for example, a dilated image or an eroded image. That is, the edges of shapes in the output data structure of image pixel data have been increased (due to dilation) or reduced (due to erosion), by an amount that includes some fractional pixel amount, as compared to the input data structure of image pixel data. The effective fractional pixel amount is ultimately determined by the scaling factor, the dilation/erosion distance, and the sub-sampling factor.

In this manner, scaling, morphological, and sub-sampling techniques may be used to dilate or erode an array of image pixel data by an amount that includes a fractional pixel amount. For example, an input data structure of image pixel data may be scaled up by a scaling factor of three (3) in each direction. The scaled-up image may be dilated (or eroded) by one (1) pixel (i.e., using a dilation or erosion distance of one (1) pixel) to generate a morphed image. The morphed image may then be sub-sampled by ⅓ in each direction (i.e., by a sub-sampling factor of three (3)) to generate a dilated or eroded output data structure of image pixel data which is the same size as the input data structure of image pixel data. This provides dilation or erosion by a fractional pixel amount of ⅓.

In another example, it may be desired to dilate or erode by a fractional pixel amount of 0.231. In such a scenario, the input data structure of image pixel data can be scaled up by a scaling factor of one-thousand (1000), in each direction, to generate a scaled-up image. The scaled-up image can be dilated (or eroded) by two-hundred-thirty-one (231) pixels (i.e., using a dilation or erosion distance of two-hundred-thirty-one (231) pixels) to generate a morphed image. The morphed image can then be sub-sampled by 1/1000 in each direction (i.e., by a sub-sampling factor of one-thousand (1000)) to generate a dilated or eroded output data structure of image pixel data which is the same size as the input data structure of image pixel data. Again, this provides dilation or erosion by a fractional pixel amount of 0.231.

FIG. 2 illustrates one embodiment of a method 200, performable by the image processing device 100 of FIG. 1, for dilating or eroding data structures of image pixel data. Method 200 is implemented to be performed by the image processing device 100 of FIG. 1, or by a computing device (e.g., an integrated circuit device) configured with an algorithm of method 200. Method 200 will be described from the perspective that the image processing device 100 (or the computing device) receives an image array in the form of an input data structure of image pixel data which is to be dilated or eroded by an amount that includes a fraction of a pixel.

The image array (input data structure of image pixel data) may be acquired by and/or originate from an image related device such as, for example, a still-image camera device, a video camera device, a scanner, or an image storage device. In accordance with one embodiment, the image processing device 100 may be a part of the image related device. In accordance with another embodiment, the image processing device 100 may be separate from the image related device and may be configured to operably connect to the image related device via an operable connection (e.g., via a network connection).

Upon initiating method 200 at 210, an input data structure of image pixel data is scaled up from a first number of pixels to a second number of pixels to generate a scaled-up data structure of image pixel data. In accordance with one embodiment, the scaling performed at 210 is performed by scaling logic 110 of FIG. 1 as previously described herein. At 220, a morphological operation is performed on the scaled-up data structure of image pixel data to generate a morphed data structure of image pixel data. The morphological operation may be a dilation operation or an erosion operation, for example, in accordance with various embodiments. In accordance with one embodiment, the morphological operation performed at 220 is performed by morphology logic 120 of FIG. 1 as previously described herein.

At 230, the morphed data structure of image pixel data is sub-sampled to generate an output data structure of image pixel data. In one embodiment, the output data structure of image pixel data has a same number of pixels (and has the same image array dimensions) as the input data structure of image pixel data. In accordance with one embodiment, sub-sampling at 230 is performed by sub-sampling logic 130 of FIG. 1 as previously described herein.

The resulting output data structure of image pixel data, produced by the method 200 of FIG. 2, is a dilated or eroded version of the input data structure of image pixel data, where the amount of dilation or erosion includes a fraction of a pixel. In this manner, scaling, morphological, and sub-sampling techniques may be used to dilate or erode an array of image pixel data by amounts which include fractional pixel amounts.

FIG. 3 illustrates one example of processing image pixel data using the method 200 of FIG. 2 as performed by the image processing device 100 of FIG. 1. For simplicity and clarity, the example of FIG. 3 operates on a single dimension of image pixel data instead of two dimensions. In particular, the input data structure of image pixel data for FIG. 3 contains the pixel values of {30, 30, 180, 60, 60} in a single dimension (e.g., a single column of pixels). When displayed, the single column of pixel values {30, 30, 180, 60, 60} may resemble a dominant center shape or object represented by the pixel value {180} sitting on a background scene represented by the pixel values {30, 30} on one side and the pixel values {60, 60} on the other side. In FIG. 3, fractional pixel dilation and erosion of ⅓ is demonstrated.

The first column (Linear interp) shown in FIG. 3 is a scaled-up data structure of image pixel data which is a result of scaling up the input data structure of image pixel data {30, 30, 180, 60, 60} by a scaling factor of three (3) using linear interpolation. In accordance with one embodiment, the scaled-up data structure of image pixel data shown in FIG. 3 is performed by scaling logic 110 of FIG. 1 at 210 of method 200 in FIG. 2.

The second column (max) shown in FIG. 3 is a morphed data structure of image pixel data which is a result of performing a sliding window operation across the first column (Linear interp) of FIG. 3. The sliding window operation uses a defined window structure of three (3) pixels based on a dilation distance of one (1) pixel to select maximum pixel values to perform dilation. Similarly, the fourth column (min) shown in FIG. 3 is a morphed data structure of image pixel data which is a result of performing a sliding window operation across the first column (Linear interp) of FIG. 3. The sliding window operation uses a defined window structure of three (3) pixels based on an erosion distance of one (1) pixel to select minimum pixel values to perform erosion. In accordance with one embodiment, the sliding window operations (morphological operations) are performed by morphology logic 120 of FIG. 1 at 220 of method 200 of FIG. 2.

The third column (Dilation_1) of FIG. 3 is an output data structure of image pixel data {30, 80, 180, 100, 60} which results from sub-sampling the second column (max) of FIG. 3 by a sub-sampling factor of three (3) (i.e., taking every third pixel value). The output data structure of image pixel data in the third column (Dilation_1) of FIG. 3 corresponds to a column of dilated image data. In accordance with one embodiment, the sub-sampling is performed by sub-sampling logic 130 of FIG. 1 at 230 of method 200 of FIG. 2.

When comparing the first column (Linear interp) of FIG. 3 {30, 30, 180, 60, 60} to the third column (Dilation_1) of FIG. 3 {30, 80, 180, 100, 60}, it is clear that the shape or object represented by the center pixel in the first and third columns of data has been spread out or dilated when going from the first column (Linear interp) to the third column (Dilation_1). For example, the second pixel value has been transformed from a value of {30} to a value of {80}, and the fourth pixel value has been transformed from a value of {60} to a value of {100}, making the shape or object in the middle portion of the third column (Dilation_1) appear wider or dilated when displayed. The resulting dilation represents a fractional pixel dilation of ⅓.

The fifth column (Erosion_1) of FIG. 3 is an output data structure of image pixel data {30, 30, 130, 60, 60} which results from sub-sampling the fourth column (min) of FIG. 3 by a sub-sampling factor of three (3) (i.e., taking every third pixel value). The output data structure of image pixel data in the fifth column (Erosion_1) of FIG. 3 corresponds to a column of eroded image data. In accordance with one embodiment, the sub-sampling is performed by sub-sampling logic 130 of FIG. 1 at 230 of method 200 of FIG. 2.

When comparing the first column (Linear interp) of FIG. 3 {30, 30, 180, 60, 60} to the fifth column (Erosion_1) of FIG. 3 {30, 30, 130, 60, 60}, it is clear that the shape or object represented by the center pixel in the first and fifth columns of data has been reduced or eroded when going from the first column (Linear interp) to the fifth column (Erosion_1). For example, the third pixel value has been transformed from a value of {180} to a value of {130}, making the shape or object in the middle portion of the fifth column (Erosion_1) appear narrower or eroded when displayed. The resulting erosion represents a fractional pixel erosion of ⅓.

Figure 4:
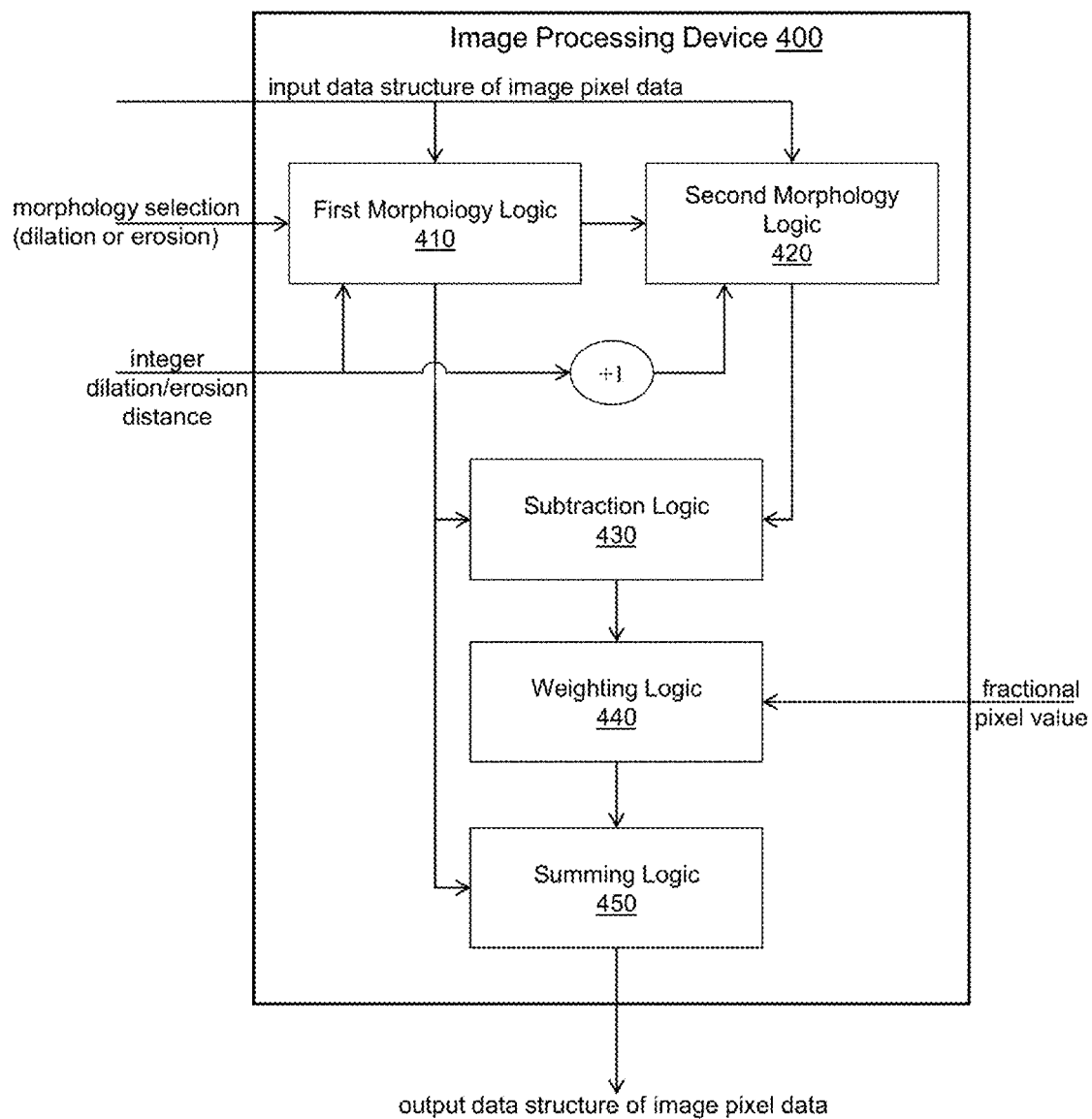
FIG. 4 illustrates one embodiment of an image processing device configured to dilate or erode data structures of image pixel data.

FIG. 4 illustrates one embodiment of an image processing device 400 configured to dilate or erode data structures of image pixel data. The image processing device 400 includes first morphology logic 410, second morphology logic 420, subtraction logic 430, weighting logic 440, and summing logic 450. In one embodiment, the image processing device 400 is implemented on a chip (i.e., a system-on-chip or SOC configuration) including one or more integrated circuits configured to perform one or more of the functions described herein (e.g., see FIG. 10). In another embodiment, the logics of the image processing device 400 may be part of an executable algorithm configured to perform the functions of the logics where the algorithm is stored in a non-transitory medium.

Referring to FIG. 4, first morphology logic 410 is configured to perform a first integer morphological operation on an input data structure of image pixel data based on a first integer morphological distance value n (e.g., 0, 1, 2, 3, etc.) to generate a first data structure of image pixel data (e.g., a first morphed image array). When the first integer morphological distance value is zero (0), the first data structure of image pixel data is the same as the input data structure of image pixel data. Again, the input data structure of image pixel data may include, for example, gray-scale image data (e.g., representing RGB colors where, for any color, the values of R, G, and B are the same) or color image data (e.g., representing RGB colors where, for any color, the values of R, G, and B may be different). Each channel of R, G, and B may be treated separately with respect to dilation and erosion, however, in accordance with one embodiment. An input data structure of image pixel data may be structured as an image array with each picture element (pixel) in the image array being assigned a data value.

In one embodiment, the first integer morphological operation may include a dilation operation that implements a sliding window operation across the input data structure of image pixel data. The sliding window operation selects a maximum pixel value from image pixel data within a defined window structure. In another embodiment the first integer morphological operation may include an erosion operation that implements a sliding window operation across the input data structure of image pixel data. The sliding window operation selects a minimum pixel value from image pixel data within a defined window structure.

As shown in FIG. 4, a morphology selection signal may be input to the image processing device 400 to select dilation or erosion, in accordance with one embodiment. Furthermore, an integer dilation/erosion distance value n (e.g., a distance value of one (1) pixel) may also be input to the image processing device 400 to establish the dilation or erosion distance to be used by first morphology logic 410. The integer dilation/erosion distance value n helps to define the window structure of the sliding window operation. For example, an integer dilation/erosion distance value of two (2) pixels may result in a 5×5 defined window structure for a two-dimensional image. The 5×5 defined window structure represents a distance of two (2) pixels in each direction from a center pixel.

Similarly, second morphology logic 420 is configured to perform a second integer morphological operation on the same input data structure of image pixel data based on a second integer morphological distance value n+1 to generate a second data structure of image pixel data (e.g., a second morphed image array). The second integer morphological operation follows the first integer morphological operation with respect to morphological type (i.e., dilation or erosion). However, the second integer morphological distance value n+1 is one integer value greater than the first integer morphological distance value n. For example, if the first integer morphological distance value is two (2), the second integer morphological distance value would be three (3).

Again, the integer dilation/erosion distance value helps to define the window structure of the sliding window operation. For example, an integer dilation/erosion distance value of three (3) pixels may result in a 7×7 defined window structure for a two-dimensional image. The 7×7 defined window structure represents a distance of three (3) pixels in each direction from a center pixel. However, other shapes and sizes of defined window structures may be possible as well, in accordance with various embodiments.

The first data structure of image pixel data is the same size as the second data structure of image pixel data, and there is a one-to-one correspondence between pixels. Furthermore, no scaling-up has occurred. That is, the first and second data structures of image pixel data are the same size as the input data structure of image pixel data. Subtraction logic 430 is configured to subtract the first data structure of image pixel data from the second data structure of image pixel data to generate a delta data structure of image pixel data.

Weighting logic 440 is configured to weight each pixel of the delta data structure of image pixel data by a fractional pixel value to generate a fractional data structure of image pixel data. As shown in FIG. 4, a fractional pixel value (between values of 0 and 1, e.g., 0.231) may be input to the image processing device 400 to select an amount of fractional pixel dilation or erosion, in accordance with one embodiment. Summing logic 450 is configured to add the fractional data structure of image pixel data to the first data structure of image pixel data to generate an output data structure of image pixel data.

The processing performed by the image processing device 400 can be represented by the following equations:

For Dilation:

output=dilation_$A$+[(dilation_$B$−dilation_$A$)*fractional pixel value], and

For Erosion:

output=erosion_$A$+[(erosion_$B$−erosion_$A$)*fractional pixel value], where A and B signify the first and second data structures of image pixel data, respectively, which are generated by first morphology logic 410 and second morphology logic 420, respectively.

In this manner, the image processing device 400 of FIG. 4 is effectively performing a linear interpolation between two integer morphological distance values to generate an output data structure of image pixel data that is dilated or eroded by an amount that includes a fractional pixel amount. The fractional pixel value can be any value between zero (0) and one (1) that can be represented within the image processing device 400.

Figure 5:
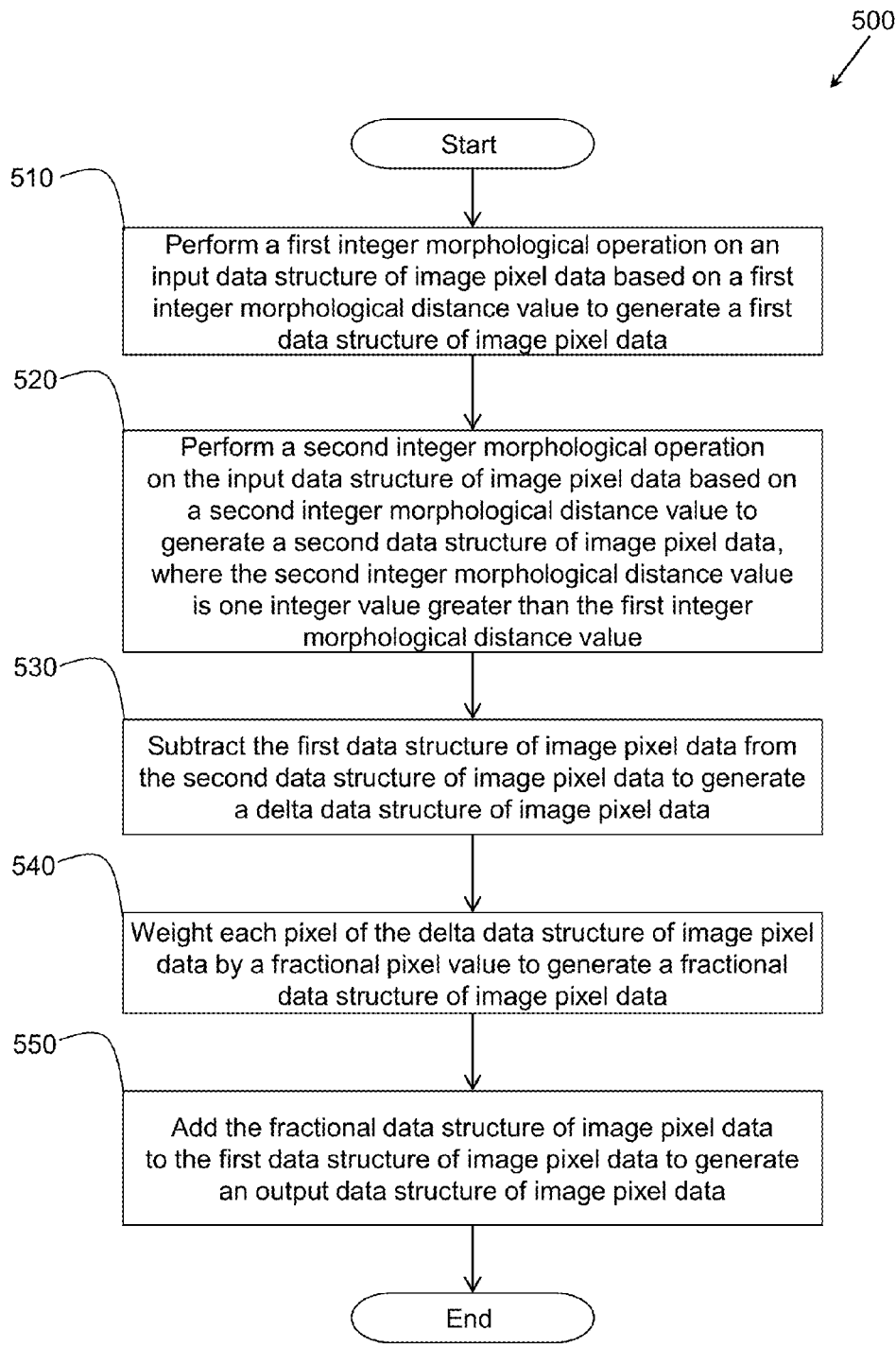
FIG. 5 illustrates one embodiment of a method, performable by the image processing device of FIG. 4, for dilating or eroding data structures of image pixel data.

FIG. 5 illustrates one embodiment of a method 500, performable by the image processing device 400 of FIG. 4, for dilating or eroding data structures of image pixel data. Method 500 is implemented to be performed by the image processing device 400 of FIG. 4, or by a computing device (e.g., an integrated circuit device) configured with an algorithm of method 500. Method 500 will be described from the perspective that the image processing device 400 (or the computing device) receives an image array in the form of an input data structure of image pixel data which is to be dilated or eroded by an amount that includes a fraction of a pixel.

Again, the image array (input data structure of image pixel data) may be acquired by and/or originate from an image related device such as, for example, a still-image camera device, a video camera device, a scanner, or an image storage device. In accordance with one embodiment, the image processing device 400 may be a part of the image related device. In accordance with another embodiment, the image processing device 400 may be separate from the image related device and may be configured to operably connect to the image related device via an operable connection (e.g., via a universal serial bus or USB connection).

Upon initiating method 500 at 510, a first integer morphological operation is performed on an input data structure of image pixel data to generate a first data structure of image pixel data (e.g., a first morphed image array). The first integer morphological operation is based on a first integer morphological distance value (e.g., {2}). In accordance with one embodiment, the first morphological integer operation is performed by first morphology logic 410 of FIG. 4 as previously described herein.

At 520, a second integer morphological operation is performed on the same input data structure of image pixel data to generate a second data structure of image pixel data (e.g., a second morphed image array). The second integer morphological operation is based on a second integer morphological distance value (e.g., {3}). The second integer morphological distance value is one integer value greater than the first integer morphological distance value. In accordance with one embodiment, the second morphological integer operation is performed by second morphology logic 420 of FIG. 4 as previously described herein.

At 530, the first data structure of image pixel data is subtracted from the second data structure of image pixel data to generate a delta data structure of image pixel data. In accordance with one embodiment, subtraction logic 430 of FIG. 4 performs the subtraction as previously described herein. At 540, each pixel of the delta data structure of image pixel data is weighted by a fractional value (between 0 and 1, e.g., 0.345) to generate a fractional data structure of image pixel data. In accordance with one embodiment, weighting logic 440 of FIG. 4 performs the weighting as previously described herein.

At 550, the fractional data structure of image pixel data is added to the first data structure of image pixel data to generate an output data structure of image pixel data. In accordance with one embodiment, summing logic 450 of FIG. 4 performs the addition as previously described herein. The resulting output data structure of image pixel data, produced by the method 500 of FIG. 5, is a dilated or eroded version of the input data structure of image pixel data, where the amount of dilation or erosion includes a fraction of a pixel. In this manner, two morphological operations may be used as part of dilating or eroding an array of image pixel data by amounts which include fractional pixel amounts.

FIG. 6 illustrates two examples of processing image pixel data using the method 500 of FIG. 5 as performed by the image processing device 400 of FIG. 4. The first example of FIG. 6 uses a fractional pixel value of 0.333 (with an effective fractional pixel dilation and erosion of 0.333 pixels) and the second example uses a fractional pixel value of 0.333 (with an effective fractional pixel dilation and erosion of 1.333 pixels). For simplicity and clarity, the examples of FIG. 6 operate on a single dimension of image pixel data instead of two dimensions.

In particular, the input data structure of image pixel data for the first example of FIG. 6 contains the pixel values of {30, 30, 180, 60, 60} in a single dimension (e.g., a single column of pixels). When displayed, the single column of pixel values {30, 30, 180, 60, 60,} may resemble a dominant center shape or object (represented by {180}) sitting on a background scene represented by {30, 30} on one side and {60, 60} on the other side. In the first example of FIG. 6, fractional pixel dilation and erosion of ⅓ (0.333) pixels is demonstrated.

The first column (f(x)) of the first example shown in FIG. 6 is a padded data structure of image pixel data which is a result of padding the input data structure of image pixel data {30, 30, 180, 60, 60} with a value of {30} on one end and a value of {60} on the other end. The padding allows for dilation and erosion distances of up to one pixel to be used across the entire input data structure of image pixel data. In accordance with one embodiment, the padding may be performed by first morphology logic 410 of FIG. 4 based on the input integer dilation/erosion distance.

The second column (Dil_A) of the first example of FIG. 6 is the result of performing a first dilation operation on the first column (f(x)) of FIG. 6 using a first dilation distance of zero (0). In accordance with one embodiment, the first dilation is performed by first morphology logic 410 of FIG. 4 at 510 of method 500 of FIG. 5. The third column (Dil_B) of the first example of FIG. 6 is the result of performing a second dilation operation on the first column (f(x)) of FIG. 6 using a second dilation distance of one (1). In accordance with one embodiment, the second dilation is performed by second morphology logic 420 of FIG. 4 at 520 of method 500 of FIG. 5. The fourth column (delta) of the first example of FIG. 6 is the result of subtracting the second column (Dil_A) from the third column (Dil_B). In accordance with one embodiment, the subtraction is performed by subtraction logic 430 of FIG. 4 at 530 of method 500 of FIG. 5.

The fifth column (Dil_3) of the first example of FIG. 6 results from weighting the fourth column (delta) by the fractional pixel value (0.333) and summing with the second column (Dil_A). The fifth column (Dil_3) of the first example of FIG. 6 represents a dilated output data structure of image pixel data. In accordance with one embodiment, the weighting is performed by weighting logic 440 of FIG. 4 at 540 of method 500 of FIG. 5. The summing is performed by summing logic 450 of FIG. 4 at 550 of method 500 of FIG. 5.

When comparing the dilated output data structure of image pixel data {30, 80, 180, 100, 60} to the input data structure of image pixel data {30, 30, 180, 60, 60}, it is clear that the shape or object represented by the center pixel in the input data structure of image pixel data has been spread out or dilated when going from the first column (f(x)) to the fifth column (Dil_3) of the first example of FIG. 6. For example, the second pixel value has been transformed from a value of {30} to a value of {80}, and the fourth pixel value has been transformed from a value of {60} to a value of {100}, making the shape or object in the middle portion of the fifth column (Dil_3) appear wider or dilated when displayed. The resulting dilation represents a pixel dilation of ⅓ or 0.333 pixels.

In the first example of FIG. 6, a similar process is performed with respect to the first (f(x)), sixth (Ero_A), seventh (Ero_B), eighth (delta), and ninth (Ero_3) columns, except using an erosion operation. As a result, when comparing the eroded output data structure of image pixel data {30, 30, 130, 60, 60} in the ninth column (Ero_3) of FIG. 6 to the input data structure of image pixel data {30, 30, 180, 60, 60}, it is clear that the shape or object represented by the center pixel in the input data structure of image pixel data has been reduced or eroded when going from the first column (f(x)) to the ninth column (Ero_3). For example, the third pixel value has been transformed from a value of {180} to a value of {130}, making the shape or object in the middle portion of the ninth column (Ero_3) appear narrower or eroded when displayed. The resulting erosion represents a pixel erosion of ⅓ or 0.333 pixels.

Referring to the second example of FIG. 6, the second example implements a fractional pixel dilation and erosion of 1.333 pixels. Just as for the first example of FIG. 6, the input data structure of image pixel data for the second example of FIG. 6 contains the pixel values of {30, 30, 180, 60, 60} in a single dimension (e.g., a single column of pixels). When displayed, the single column of pixel values {30, 30, 180, 60, 60,} may resemble a dominant center shape or object (represented by {180}) sitting on a background scene represented by {30, 30} on one side and {60, 60} on the other side. However, in the second example of FIG. 6, fractional pixel dilation and erosion of 1.333 pixels is demonstrated.

The first column (f(x)) of the second example shown in FIG. 6 is a padded data structure of image pixel data which is a result of padding the input data structure of image pixel data {30, 30, 180, 60, 60} with values of {30, 30} on one end and values of {60, 60} on the other end. The padding allows for dilation and erosion distances of up to two pixels to be used across the entire input data structure of image pixel data. In accordance with one embodiment, the padding may be performed by first morphology logic 410 of FIG. 4 based on the input integer dilation/erosion distance.

The second column (Dil_A) of the second example of FIG. 6 is the result of performing a first dilation operation on the first column (f(x)) of FIG. 6 using a first dilation distance of one (1). In accordance with one embodiment, the first dilation operation is performed by first morphology logic 410 of FIG. 4 at 510 of method 500 of FIG. 5. The third column (Dil_B) of the second example of FIG. 6 is the result of performing a second dilation operation on the first column (f(x)) of FIG. 6 using a second dilation distance of two (2). In accordance with one embodiment, the second dilation operation is performed by second morphology logic 420 of FIG. 4 at 520 of method 500 of FIG. 5.

The fourth column (delta) of the second example of FIG. 6 is the result of subtracting the second column (Dil_A) from the third column (Dil_B). In accordance with one embodiment, the subtraction operation is performed by subtraction logic 430 of FIG. 4 at 530 of method 500 of FIG. 5. The fifth column (Dil_3) of the second example of FIG. 6 results from weighting the fourth column (delta) by the fractional pixel value (0.333) and summing with the second column (Dil_A). The fifth column (Dil_3) of the second example of FIG. 6 represents a dilated output data structure of image pixel data. In accordance with one embodiment, the weighting is performed by weighting logic 440 of FIG. 4 at 540 of method 500 of FIG. 5. The summing is performed by summing logic 450 of FIG. 4 at 550 of method 500 of FIG. 5.

When comparing the dilated output data structure of image pixel data {80, 180, 180, 180, 100} to the input data structure of image pixel data {30, 30, 180, 60, 60}, it is clear that the shape or object represented by the center pixel in the input data structure of image pixel data has been spread out or dilated when going from the first column (f(x)) to the fifth column (Dil_3) of the second example of FIG. 6. For example, the first pixel value has been transformed from a value of {30} to a value of {80}, the second pixel value has been transformed from a value of {30} to a value of {180}, the fourth pixel value has been transformed from a value of {60} to a value of {180}, and the fifth pixel value has been transformed from a value of {60} to a value of {100}, making the shape or object in the middle portion of the fifth column (Dil_3) appear wider or dilated when displayed. The resulting dilation represents a pixel dilation of 1.333 pixels.

In the second example of FIG. 6, a similar process is performed with respect to the first (f(x)), sixth (Ero_A), seventh (Ero_B), eighth (delta), and ninth (Ero_3) columns, except using an erosion operation. As a result, when comparing the eroded output data structure of image pixel data {30, 30, 30, 50, 60} in the ninth column (Ero_3) of FIG. 6 to the input data structure of image pixel data {30, 30, 180, 60, 60}, it is clear that the shape or object represented by the center pixel in the input data structure of image pixel data has been reduced or eroded when going from the first column (f(x)) to the ninth column (Ero_3). For example, the third pixel value has been transformed from a value of {180} to a value of {30} and the fifth pixel value has been transformed from a value of {60} to a value of {50}, making the shape or object in the middle portion of the ninth column (Ero_3) appear narrower or eroded when displayed. The resulting erosion represents a pixel erosion of 1.333 pixels. Another way to look at the example is that the middle value of {180} has been removed or completely swallowed.

FIG. 7 illustrates one embodiment of an image processing device 700 configured to dilate or erode data structures of image pixel data. The image processing device of FIG. 7 takes into consideration the differences between any given pixel and corresponding surrounding pixels. Fractional weighting of the differences is performed and a morphological operation is performed on the weighted fractional differences.

The image processing device 700 includes morphology logic 710, subtraction logic 720, weighting logic 730, selection logic 740, and summing logic 750. In one embodiment, the image processing device 700 is implemented on a chip (i.e., a system-on-chip or SOC configuration) including one or more integrated circuits configured to perform one or more of the functions described herein. In another embodiment, the logics of the image processing device 700 may be part of an executable algorithm configured to perform the functions of the logics where the algorithm is stored in a non-transitory medium.

Referring to FIG. 7, morphology logic 710 is configured to perform an integer dilation or erosion operation on an input data structure of image pixel data based on an integer dilation or erosion distance value (e.g., 0, 1, 2, 3, etc.) to generate a first data structure of image pixel data (e.g., a dilated or eroded image array). The integer dilation or erosion distance value represents the integer part of a total dilation and erosion distance. As shown in FIG. 7, a morphology selection signal may be input to the image processing device 700 to select dilation or erosion, in accordance with one embodiment. Furthermore, an integer dilation/erosion distance value may also be input to the image processing device 700 to establish the integer dilation or erosion distance to be used by morphology logic 710.

For a given pixel in the first data structure of image pixel data, the given pixel is surrounded by eight corresponding adjacent pixels. Subtraction logic 720 is configured to, for each pixel in the first data structure of image pixel data, perform a subtraction operation between each pixel and each of eight corresponding adjacent pixels, as well as between the pixel and itself to yield a value of zero (0), to generate nine delta values. Also, for each pixel in the first data structure of image pixel data, weighting logic 730 is configured to weight each of the nine delta values by a fractional pixel value to generate nine weighted values. The fractional pixel value represents the fractional part of the total dilation or erosion distance. Even though the examples provided herein apply a single fractional pixel value to the pixels, the weighting function can provide a different fractional value for each pixel location in the window, in accordance with one embodiment. For example, there may be nine (8) different fractional pixel values for a 3×3 window. Such flexibility allows corner locations of the window to be included or not, and also have different fractional values for vertical, horizontal, and diagonal directions if desired.

For dilation, selection logic 740 is configured to select a maximum value of the nine weighted values for each pixel in the first data structure of image pixel data to generate a maximum data structure of image pixel data. For erosion, selection logic 740 is configured to select a minimum value of the nine weighted values for each pixel in the first data structure of image pixel data to generate a minimum data structure of image pixel data. As shown in FIG. 7, the morphology selection signal may be input to selection logic 740 to select dilation or erosion, in accordance with one embodiment.

For dilation, summing logic 750 is configured to add the first data structure of image pixel data to the maximum data structure of image pixel data to generate a dilated data structure of image pixel data. For erosion, summing logic 750 is configured to add the first data structure of image pixel data to the minimum data structure of image pixel data to generate an eroded data structure of image pixel data. As shown in FIG. 7, the morphology selection signal may be input to summation logic 750 to select dilation or erosion, in accordance with one embodiment. In one embodiment, summing logic 750 is configured as a simple adder.

The processing performed by the image processing device 700 can be represented by the following equations:

For Dilation:

$$\text{output} = f(x) + \max[\text{fractional pixel value} * (f(x) - f(y))],$$

and

For Erosion:

$$\text{output} = f(x) + \min[\text{fractional pixel value} * (f(x) - f(y))],$$

where f(x) represents the first data structure of image pixel data generated by morphology logic 710, and (f(x)−f (y)) represents the nine delta values for each pixel in f(x) generated by subtraction logic 720. Again, even though the examples provided herein apply a single fractional pixel value to the pixels, the weighting function can provide a different fractional value for each pixel location in the window, in accordance with one embodiment. Furthermore, the center pixel is included in the calculation by presenting a zero (0) value into the max and min functions. Therefore, nine (9) values are involved in the calculation instead of eight (8) values, forcing the dilation value to never go negative even is all eight (8) values are negative. Similarly, this forces the erosion value to never go positive even if all eight (8) values are greater than zero (0).

As an example, for a dilation distance of 1.5 pixels, an input data structure of image pixel data may first be dilated or eroded by an integer amount of one (1) by morphology logic 710. The fractional part, 0.5, of the dilation or erosion may be completed by subtraction logic 720, weighting logic 730, selection logic 740, and summing logic 750.

In this manner, the image processing device 700 of FIG. 7 is effectively performing fractional pixel weighting inside a morphology operation (i.e., inside the max/min selection operation performed by selection logic 740). The fractional pixel value can be any value between zero (0) and one (1) that can be represented within the image processing device 700.

FIG. 8 illustrates one embodiment of a method 800, performable by the image processing device 700 of FIG. 7, for dilating or eroding data structures of image pixel data. Method 800 is implemented to be performed by the image processing device 700 of FIG. 7, or by a computing device (e.g., an integrated circuit device) configured with an algorithm of method 800. Method 800 will be described from the perspective that the image processing device 700 (or the computing device) receives an image array in the form of an input data structure of image pixel data.

Again, the image array (input data structure of image pixel data) may be acquired by and/or originate from an image related device such as, for example, a still-image camera device, a video camera device, or an image storage device. In accordance with one embodiment, the image processing device 700 may be a part of the image related device. In accordance with another embodiment, the image processing device 700 may be separate from the image related device and may be configured to operably connect to the image related device via an operable connection (e.g., via a WiFi connection).

Upon initiating method 800 at 810, an integer dilation or erosion operation is performed on an input data structure of image pixel data based on an integer dilation or erosion distance value to generate a first data structure of image pixel data (e.g., a dilation image array or an erosion image array). In accordance with one embodiment, the integer dilation or erosion operation is performed by morphology logic 710 of FIG. 7 as previously described herein. At 820, for each pixel in the first data structure of image pixel data, a subtraction operation is performed between each pixel and each of nine corresponding adjacent pixels, including the pixel itself, to generate nine delta values. In accordance with one embodiment, the subtraction operation is performed by subtraction logic 720 of FIG. 7 as previously described herein.

At 830, for each pixel in the first data structure of image pixel data, each of the nine delta values are weighted by a fractional pixel value to generate nine weighted values. In accordance with one embodiment, the weighting is performed by weighting logic 730 of FIG. 7 as previously described herein. At 840, if dilation is being performed, a maximum value of the nine weighted values is selected for each pixel in the first data structure of image pixel data to generate a maximum data structure of image pixel data. Alternately at 840, if erosion is being performed, a minimum value of the nine weighted values is selected for each pixel in the first data structure of image pixel data to generate a minimum data structure of image pixel data. In accordance with one embodiment, the selection is performed by selection logic 740 of FIG. 7 as previously described herein.

At 850, if dilation is being performed, the first data structure of image pixel data is added to the maximum data structure of image pixel data to generate a dilated data structure of image pixel data (i.e., an output data structure of image pixel data). Alternately at 850, if erosion is being performed, the first data structure of image pixel data is added to the minimum data structure of image pixel data to generate an eroded data structure of image pixel data (i.e., an output data structure of image pixel data). In accordance with one embodiment, the addition is performed by summing logic 750 of FIG. 7 as previously described herein.

The resulting output data structure of image pixel data, produced by method 800 of FIG. 8, is a dilated or eroded version of the input data structure of image pixel data, where the amount of dilation or erosion includes a fraction of a pixel. In this manner, a specific combination of subtraction, weighting, selection, and summing techniques may be used to dilate or erode an array of image pixel data by amounts which include fractional pixel amounts.

FIG. 9 illustrates one example of processing image pixel data using the method 800 of FIG. 8 as performed by the image processing device 700 of FIG. 7. The example of FIG. 9 uses a fractional pixel value of 0.333 (with an effective fractional pixel dilation and erosion of 0.333 pixels). For simplicity and clarity, the example of FIG. 9 operates on a single dimension of image pixel data instead of two dimensions.

In particular, the input data structure of image pixel data for the example of FIG. 9 contains the pixel values of {30, 30, 180, 60, 60} in a single dimension (e.g., a single column of pixels). When displayed, the single column of pixel values {30, 30, 180, 60, 60,} may resemble a dominant center shape or object (represented by the pixel value of {180}) sitting on a background scene represented by the pixel values of {30, 30} on one side and {60, 60} on the other side. In the example of FIG. 9, fractional pixel dilation and erosion of ⅓ (0.333) pixels is demonstrated.

The first column (f(x)) of the example shown in FIG. 9 is a padded data structure of image pixel data which is a result of padding the input data structure of image pixel data {30, 30, 180, 60, 60} with a pixel value of {30} on one end and a pixel value of {60} on the other end. The padding allows for dilation and erosion distances of up to one pixel to be used across the entire input data structure of image pixel data. In accordance with one embodiment, the padding is performed by morphology logic 710 of FIG. 7 based on the input integer dilation/erosion distance. Furthermore, for the example of FIG. 9, it is assumed that morphology logic 710 of FIG. 7 has performed an integer dilation (or erosion) operation at 810 in the method 800 of FIG. 8 using a morphology distance of zero (0). Therefore, the output of morphology logic 710 is simply the padded version of the input data structure of image pixel data {30, 30, 180, 60, 60}.

The second and third columns of the example of FIG. 9 are the result of performing subtraction operations on the first column (f(x)) of FIG. 9 between each pixel and the two (2) corresponding adjacent pixels (and between each pixel and itself) to generate three delta values (even though the zero value for subtraction between a pixel and itself is not shown in the second and third columns. Note that, in a larger two-dimensional input data structure of image pixel data, the number of corresponding adjacent pixels, including the pixel itself, would be nine (9). In accordance with one embodiment, the subtraction operations are performed by subtraction logic 710 of FIG. 7 at 820 in the method 800 of FIG. 8.

The fourth column (max(b2*delta)) of the example of FIG. 9 is the result of weighting each of the three (3) delta values for each pixel in the first data structure of image pixel data by the fractional pixel value (b2) of 0.333 and taking the maximum value (for dilation). In accordance with one embodiment, the weighting is performed by weighting logic 730 of FIG. 7 at 830 in the method 800 of FIG. 8. Taking the maximum value is performed by selection logic 740 of FIG. 7 at 840 in the method 800 of FIG. 8.

The fifth column (Dilation_2) of the example of FIG. 9 is the result of adding the input data structure of image pixel data {30, 30, 180, 60, 60} to the fourth column ((max(b2*delta)) to obtain a dilated data structure of image pixel data {30, 80, 180, 100, 60}. In accordance with one embodiment, the addition is performed by summing logic 750 of FIG. 7 at 850 in the method 800 of FIG. 8.

When comparing the dilated output data structure of image pixel data {30, 80, 180, 100, 60} to the input data structure of image pixel data {30, 30, 180, 60, 60}, it is clear that the shape or object represented by the center pixel in the input data structure of image pixel data has been spread out or dilated when going from the first column (f(x)) to the fifth column (Dilation_2) of the example of FIG. 9. For example, the second pixel value has been transformed from a value of {30} to a value of {80}, and the fourth pixel value has been transformed from a value of {60} to a value of {100}, making the shape or object in the middle portion of the fifth column (Dilation_2) appear wider or dilated when displayed. The resulting dilation represents a pixel dilation of ⅓ or 0.333 pixels.

Similarly, for the case of erosion, the sixth column (min(b2*delta)) of the example of FIG. 9 is the result of weighting each of the three (3) delta values for each pixel in the first data structure of image pixel data by the fractional pixel value (b2) of 0.333 and taking the minimum value (for erosion). In accordance with one embodiment, the weighting is performed by weighting logic 730 of FIG. 7 at 830 in the method 800 of FIG. 8. Taking the minimum value is performed by selection logic 740 of FIG. 7 at 840 in the method 800 of FIG. 8.

The seventh column (Erosion_2) of the example of FIG. 9 is the result of adding the input data structure of image pixel data {30, 30, 180, 60, 60} to the sixth column ((min(b2*delta)) to obtain an eroded data structure of image pixel data {30, 80, 130, 100, 60}. In accordance with one embodiment, the addition is performed by summing logic 750 of FIG. 7 at 850 in the method 800 of FIG. 8.

When comparing the eroded output data structure of image pixel data {30, 30, 130, 60, 60} in the seventh column (Erosion_2) of FIG. 9 to the input data structure of image pixel data {30, 30, 180, 60, 60}, it is clear that the shape or object represented by the center pixel in the input data structure of image pixel data has been reduced or eroded when going from the first column (f(x)) to the seventh column (Erosion_2). For example, the third pixel value has been transformed from a value of {180} to a value of {130}, making the shape or object in the middle portion of the seventh column (Erosion_2) appear narrower or eroded when displayed. The resulting erosion represents a pixel erosion of ⅓ or 0.333 pixels.

It is noted here that each of the methods 200, 500, and 700 may produce a same output result (i.e., a same output data structure of image pixel data) when presented with a same input data structure of image pixel data, as illustrated by the examples of FIG. 3, FIG. 6, and FIG. 9 herein. The three methods 200, 500, and 700 represent various approaches for performing fractional pixel image dilation and erosion. One approach may be more appropriate for one type of input data structure of image pixel data, and another approach may be more appropriate for another type of input data structure of image pixel data, for example.

Integrated Circuit Device Embodiment

Figure 10:
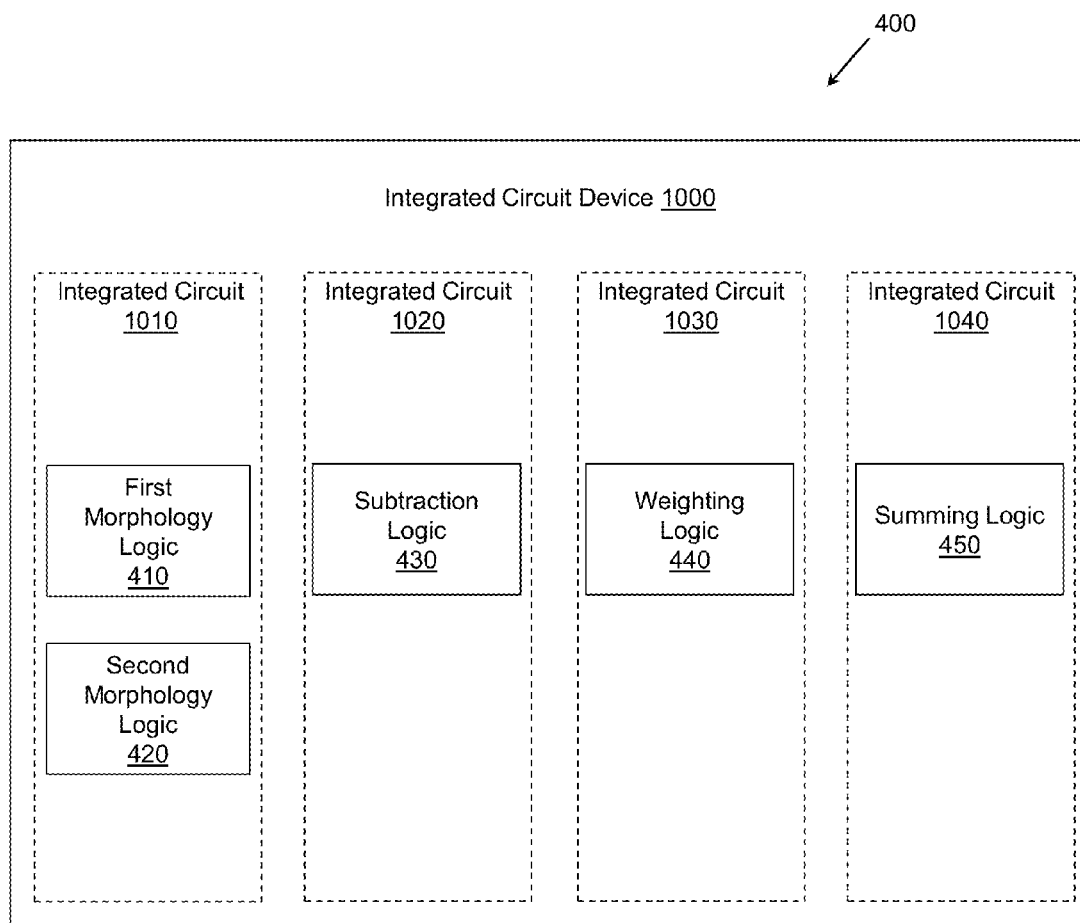
FIG. 10 illustrates one embodiment of the image processing device of FIG. 4 implemented as an integrated circuit device.

FIG. 10 illustrates one embodiment of the image processing device 400 of FIG. 4 implemented as an integrated circuit device 1000. In this embodiment, the first morphology logic 410 and the second morphology logic 420 are each embodied on the same integrated circuit 1010. The subtraction logic 430, the weighting logic 440, and the summing logic 450 are each embodied as a separate integrated circuit 1020, 1030, and 1040, respectively.

The circuits are connected via connection paths to communicate signals. While integrated circuits 1010, 1020, 1030, and 1040 are illustrated as separate integrated circuits, they may be integrated into a common integrated circuit device 1000. Additionally, integrated circuits 1010, 1020, 1030, and 1040 may be combined into fewer integrated circuits or divided into more integrated circuits than illustrated. Similarly, the image processing devices 100 and 700 of FIG. 1 and FIG. 7, respectively, may each be implemented as an integrated circuit device, in accordance with certain embodiments.

In another embodiment, the first morphology logic 410, the second morphology logic 420, the subtraction logic 430, the weighting logic 440, and the summing logic 450 (which are illustrated in integrated circuits 1010, 1020, 1030, and 1040) may be combined into a separate application-specific integrated circuit. In other embodiments, portions of the functionality associated with the first morphology logic 410, the second morphology logic 420, the subtraction logic 430, the weighting logic 440, and the summing logic 450 may be embodied as firmware executable by a processor and stored in a non-transitory memory (e.g., a non-transitory computer storage medium).

Three different types of systems, methods, and other embodiments associated with performing fractional pixel morphological operations on images have been described. One embodiment scales up an input data structure of image pixel data, performs a dilation or erosion operation on the scaled up image data, and sub-samples the dilated or eroded image data to generate an output data structure of image pixel data. Another embodiment performs two integer morphological operations on an input data structure of image pixel data to form first and second morphological images, subtracts the first and second morphological images to form a delta image, weights the delta image to form a fractional image, and adds the fractional image to the first morphological image to form an output data structure of image pixel data. In yet another embodiment, for each pixel in a first data structure of image pixel data, a subtraction operation is performed between a pixel and each of nine adjacent pixels, including the pixel itself, to generate nine delta values. Also, for each pixel in the first data structure of image pixel data, each of the nine delta values is weighted by a fractional value to form nine weighted values. A maximum value of the nine weighted values is selected for each pixel in the first data structure of image pixel data to generate a maximum data structure of image pixel data. Alternately, a minimum value of the nine weighted values is selected for each pixel in the first data structure of image pixel data to form a minimum data structure of image pixel data. The first data structure of image pixel data may be added to the maximum data structure of image pixel data to form a dilated data structure of image pixel data. Alternately, the first data structure of image pixel data may be added to the minimum data structure of image pixel data to form an eroded data structure of image pixel data.

DEFINITIONS AND OTHER EMBODIMENTS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

An "operable (or operative) connection", or a connection by which entities are "operably (or operatively) connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection. The terms "operable" and "operative", and there various forms, may be used interchangeably herein.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims.

What is claimed is:

1. An integrated circuit device, the integrated circuit device comprising:
    subtraction logic configured to, for each pixel in a first data structure of image pixel data, perform a subtraction operation between a pixel and each of nine adjacent pixels, including the pixel itself, to generate nine delta values;
    weighting logic configured to, for each pixel in the first data structure of image pixel data, weight each of the nine delta values by a fractional pixel value to generate nine weighted values;
    selection logic configured to:
        (i) select a maximum value of the nine weighted values for each pixel in the first data structure of image pixel data to generate a maximum data structure of image pixel data, or
        (ii) select a minimum value of the nine weighted values for each pixel in the first data structure of image pixel data to generate a minimum data structure of image pixel data; and
    summing logic configured to:
        (i) add the first data structure of image pixel data to the maximum data structure of image pixel data to generate a dilated data structure of image pixel data, or
        (ii) add the first data structure of image pixel data to the minimum data structure of image pixel data to generate an eroded data structure of image pixel data.

2. The integrated circuit device of claim 1, wherein the first data structure of image pixel data includes gray-scale image data.

3. The integrated circuit device of claim 1, wherein the first data structure of image pixel data includes color image data.

4. The integrated circuit device of claim 1, further comprising morphology logic configured to perform an integer dilation operation on an input data structure of image pixel data based on an integer dilation distance value to generate the first data structure of image pixel data.

5. The integrated circuit device of claim 1, further comprising morphology logic configured to perform an integer erosion operation on an input data structure of image pixel data based on an integer erosion distance value to generate the first data structure of image pixel data.

6. A method comprising:
    performing a first integer morphological operation on an input data structure of image pixel data based on a first integer morphological distance value to generate a first data structure of image pixel data, wherein the first integer morphological distance corresponds to a distance in an integer number of pixels from a center pixel over which the first integer morphological operation is to be performed;
    performing a second integer morphological operation on the input data structure of image pixel data based on a second integer morphological distance value to generate a second data structure of image pixel data, where the second integer morphological distance value is one integer value greater than the first integer morphological distance value;
    subtracting the first data structure of image pixel data from the second data structure of image pixel data to generate a delta data structure of image pixel data;
    weighting each pixel of the delta data structure of image pixel data by a fractional pixel value to generate a fractional data structure of image pixel data; and
    adding the fractional data structure of image pixel data to the first data structure of image pixel data to generate an output data structure of image pixel data.

7. The method of claim 6, wherein the first integer morphological distance value is zero.

8. The method of claim 6, wherein the first integer morphological distance value is one or greater.

9. The method of claim 6, wherein the input data structure of image pixel data includes gray-scale image data.

10. The method of claim 6, wherein the input data structure of image pixel data includes color image data.

11. The method of claim 6, wherein the morphological operations include a dilation operation that implements a sliding window operation which selects a maximum pixel value from pixel data within a defined window structure of the sliding window operation.

12. The method of claim 6, wherein the morphological operations include an erosion operation that implements a sliding window operation which selects a minimum pixel value from pixel data within a defined window structure of the sliding window operation.

13. An apparatus comprising:
    scaling logic configured to scale up an input data structure of image pixel data from a first number of pixels to a second number of pixels to generate a scaled-up data structure of image pixel data;
    morphology logic configured to:
        (i) perform a first integer morphological operation on the scaled-up data structure based on a first integer morphological distance value to generate a first data structure of image pixel data, wherein the first integer morphological distance corresponds to a distance in an integer number of pixels from a center pixel over which the first integer morphological operation is to be performed; and
        (ii) perform a second integer morphological operation on the scaled-up data structure of image pixel data based on a second integer morphological distance value to generate a second data structure of image pixel data, where the second integer morphological distance value is greater than the first integer morphological distance value; and
    sub-sampling logic configured to sub-sample a morphed data structure of image pixel data to generate an output data structure of image pixel data having a same number of pixels as the input data structure of image pixel data, wherein the morphed data structure of image pixel data is generated based on the first data structure of image pixel data and the second data structure of image pixel data.

14. The apparatus of claim 13, wherein the scaling logic includes a linear interpolation algorithm.

15. The apparatus of claim 13, wherein the scaling logic includes a bi-linear scaling algorithm.

16. The apparatus of claim 13, wherein the scaling logic includes a bi-cubic scaling algorithm.

17. The apparatus of claim 13, wherein the first integer morphological operation includes a dilation operation that implements a sliding window operation which selects a maximum pixel value from image pixel data within a defined window structure of the sliding window operation.

18. The apparatus of claim 13, wherein the first integer morphological operation includes an erosion operation that implements a sliding window operation which selects a minimum pixel value from image pixel data within a defined window structure of the sliding window operation.

19. The apparatus of claim 13, wherein the input data structure of image pixel data includes gray-scale image data.

20. The apparatus of claim 13, wherein the input data structure of image pixel data includes color image data.

21. An apparatus comprising:
a processor connected to memory; and
image processing logic stored within the memory and executable by the processor to generate an output data structure of image pixel data by dilating or eroding an input data structure of image pixel data by a fractional pixel amount, wherein the image processing logic includes:
first morphology logic configured to perform a first integer morphological operation on the input data structure of image pixel data based on a first integer morphological distance value to generate a first data structure of image pixel data, wherein the first integer morphological distance corresponds to a distance in an integer number of pixels from a center pixel over which the first integer morphological operation is to be performed;
second morphology logic configured to perform a second integer morphological operation on the input data structure of image pixel data based on a second integer morphological distance value to generate a second data structure of image pixel data, where the second integer morphological distance value is one integer value greater than the first integer morphological distance value;
subtraction logic configured to subtract the first data structure of image pixel data from the second data structure of image pixel data to generate a delta data structure of image pixel data;
weighting logic configured to weight each pixel of the delta data structure of image pixel data by a fractional pixel value to generate a fractional data structure of image pixel data; and
summing logic configured to add the fractional data structure of image pixel data to the first data structure of image pixel data to generate the output data structure of image pixel data.

* * * * *